United States Patent
Ushigome

(10) Patent No.: US 11,420,380 B2
(45) Date of Patent: Aug. 23, 2022

(54) SHAPING DEVICE AND PRODUCTION METHOD FOR SHAPED OBJECT

(71) Applicant: CASIO COMPUTER CO., LTD., Tokyo (JP)

(72) Inventor: Youichi Ushigome, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 17/191,774

(22) Filed: Mar. 4, 2021

(65) Prior Publication Data
US 2021/0299939 A1    Sep. 30, 2021

(30) Foreign Application Priority Data

Mar. 24, 2020  (JP) .............................. JP2020-052286
Dec. 14, 2020  (JP) .............................. JP2020-207002

(51) Int. Cl.
| | | |
|---|---|---|
| *B29C 59/16* | (2006.01) | |
| *B29C 44/34* | (2006.01) | |
| *B29C 59/04* | (2006.01) | |
| *B29C 35/08* | (2006.01) | |
| *B29C 35/00* | (2006.01) | |

(Continued)

(52) U.S. Cl.
CPC ............ *B29C 59/16* (2013.01); *B29C 35/007* (2013.01); *B29C 35/041* (2013.01); *B29C 35/045* (2013.01); *B29C 35/0805* (2013.01); *B29C 35/10* (2013.01); *B29C 44/3403* (2013.01); *B29C 44/3415* (2013.01); *B29C 59/046* (2013.01); *B29C 2035/0283* (2013.01); *B29C 2035/0822* (2013.01); *B29C 2035/1616* (2013.01); *B29C 2035/1658* (2013.01)

(58) Field of Classification Search
CPC .... B29C 2035/0283; B29C 2035/0822; B29C 44/022; B29C 44/28; B29C 44/285; B29C 44/30; B29C 44/302; B29C 44/304; B29C 44/306; B29C 44/308; B29C 44/3415; B29C 35/0805; B29C 2795/002; B32B 5/18
See application file for complete search history.

(56) References Cited

U.S. PATENT DOCUMENTS

| | | | | |
|---|---|---|---|---|
| 5,509,795 | A * | 4/1996 | Near ....................... | B29C 44/28 425/141 |
| 6,287,024 | B1 * | 9/2001 | Furukawa ................. | G03F 7/40 396/611 |

(Continued)

FOREIGN PATENT DOCUMENTS

| | | |
|---|---|---|
| JP | 356155786 A * | 12/1981 |
| JP | H05345360 A | 12/1993 |

(Continued)

OTHER PUBLICATIONS

Japanese Office Action (and English language translation thereof) dated May 31, 2022, issued in counterpart Japanese Application No. 2020-207002.

*Primary Examiner* — Atul P. Khare
(74) *Attorney, Agent, or Firm* — Holtz, Holtz & Volek PC

(57) ABSTRACT

In a shaping device, a sheet that distends due to being irradiated with electromagnetic waves is placed a conveyor belt. An irradiator irradiates the sheet placed on and conveyed by the conveyor belt with electromagnetic waves. At least one heater heats the conveyor belt.

19 Claims, 7 Drawing Sheets

(51) Int. Cl.
*B29C 35/10* (2006.01)
*B29C 35/04* (2006.01)
*B41M 7/00* (2006.01)
*B29C 35/02* (2006.01)
*B29C 35/16* (2006.01)

(56) References Cited

U.S. PATENT DOCUMENTS

| | | | |
|---|---|---|---|
| 7,314,365 B2* | 1/2008 | Inoue | B41J 2/0057 |
| | | | 425/328 |
| 8,870,327 B2* | 10/2014 | Kanamura | B41J 2/205 |
| | | | 347/15 |
| 9,162,486 B2* | 10/2015 | Motoyanagi | B29C 35/0266 |
| 9,492,956 B2* | 11/2016 | Horiuchi | B41J 3/28 |
| 9,975,361 B2* | 5/2018 | Okamura | B41J 11/004 |
| 10,065,431 B2* | 9/2018 | Ushigome | B41M 3/06 |
| 10,166,784 B2* | 1/2019 | Tamura | B41J 29/377 |
| 10,414,076 B2* | 9/2019 | Horiuchi | B29C 44/022 |
| 10,618,320 B2* | 4/2020 | Nishiura | B29C 64/264 |
| 10,654,198 B2* | 5/2020 | Saito | B29C 59/18 |
| 10,710,284 B2* | 7/2020 | Ushigome | B32B 29/04 |
| 10,717,211 B2* | 7/2020 | Saito | B29C 61/04 |
| 11,097,565 B2* | 8/2021 | Takahashi | B32B 29/002 |
| 11,186,017 B2* | 11/2021 | Ushigome | B29C 44/022 |
| 2004/0036922 A1* | 2/2004 | Yamada | G03G 15/224 |
| | | | 358/3.21 |
| 2013/0280498 A1* | 10/2013 | Horiuchi | B32B 37/0076 |
| | | | 156/227 |
| 2018/0272777 A1* | 9/2018 | Ushigome | B29C 37/00 |
| 2020/0180212 A1* | 6/2020 | Horiuchi | B29C 44/3415 |
| 2020/0391435 A1* | 12/2020 | Horiuchi | B29C 64/268 |

FOREIGN PATENT DOCUMENTS

| | | | |
|---|---|---|---|
| JP | 2005283927 A | * | 10/2005 |
| JP | 2013129144 A | | 7/2013 |
| JP | 2013178353 A | | 9/2013 |
| JP | 2016150439 A | | 8/2016 |
| JP | 2018024103 A | * | 2/2018 |
| JP | 2018144449 A | * | 9/2018 |

* cited by examiner

SHAPING DEVICE AND PRODUCTION METHOD FOR SHAPED OBJECT

CROSS-REFERENCE TO RELATED APPLICATION

This application claims the benefit of Japanese Patent Application No. 2020-052286, filed on Mar. 24, 2020, and Japanese Patent Application No. 2020-207002, filed on Dec. 14, 2020, of which the entirety of the disclosures is incorporated by reference herein.

FIELD

The present disclosure relates generally to a shaping device and a production method for a shaped object.

BACKGROUND

In the related art, techniques are known for producing a shaped object using a medium that distends as a result of being irradiated with electromagnetic waves. For example, Japanese Unexamined Patent Application Publication No. 2013-178353 discloses an image forming device that forms, as a shaped object, a three-dimensional image by irradiating light on a medium that includes a thermally expansive layer containing a thermally expandable material that expands due to heat. More specifically, the image forming device disclosed in Japanese Unexamined Patent Application No. 2013-178353 forms, on a medium, a developer image using a developer that contains a light absorbing material, and irradiates the medium on which the developer image is formed with light having a wavelength that the developer can absorb.

SUMMARY

A shaping device according to the present disclosure that achieves the objective described above includes:
 a conveyor belt on which a sheet is placed, the sheet distending due to being irradiated with electromagnetic waves;
 an irradiator that irradiates the electromagnetic waves on the sheet placed on the conveyor belt; and
 at least one heater that heats the conveyor belt.

BRIEF DESCRIPTION OF THE DRAWINGS

A more complete understanding of this application can be obtained when the following detailed description is considered in conjunction with the following drawings, in which.

DETAILED DESCRIPTION

Figure 1:
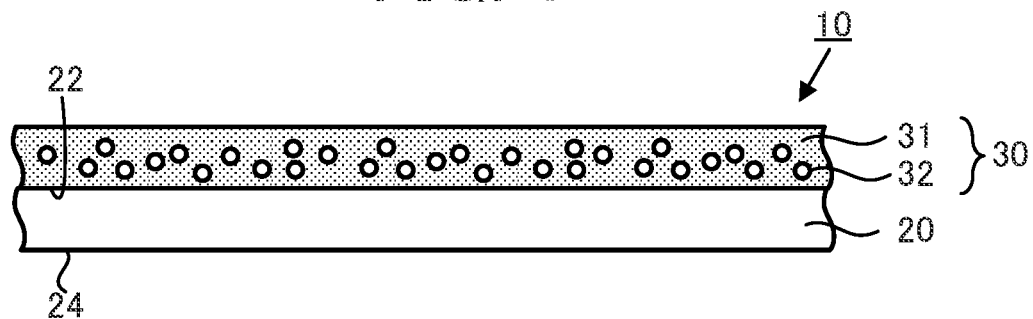
FIG. 1 is a cross-sectional view of a sheet according to Embodiment 1 of the present disclosure.

Hereinafter, embodiments of the present disclosure are described while referencing the drawings. Note that, in the drawings, identical or corresponding components are denoted with the same reference numerals.

Embodiment 1

Sheet 10

FIG. 1 illustrates a cross-section of the structure of a sheet 10 (formable sheet) according to Embodiment 1 of the present disclosure. The sheet 10 is for producing a shaped object. The sheet 10 is a medium in which a pre-selected portion is heated and thereby distended to shape a shaped object. The sheet 10 is also called a thermally expandable sheet.

The shaped object is an object having a three-dimensional shape and is shaped in the two-dimensional sheet as a result of a portion of the sheet distending in a direction outward from a front surface of the sheet. The shaped object is also referred to as a three-dimensional object or a three-dimensional image. The shaped object may have a general shape such as a simple shape, a geometrical shape, or a character.

More specifically, the shaped object of the present embodiment uses, as a reference, a particular two-dimensional plane within three-dimensional space, and includes unevenness in a direction perpendicular or in a direction diagonal to that two-dimensional plane. This shaped object is included in a three-dimensional (3-dimensional) images, but to distinguish this shaped object from a three-dimensional image produced using a so-called 3D printing technique, the shaped object is called a 2.5-dimensional (2.5D) image or a pseudo-three-dimensional (pseudo-3D) image. Furthermore, the technique for producing the shaped object is included in three-dimensional image printing techniques, but to distinguish this technique from a so-called 3D printer, the technique is called a 2.5-dimensional printing technique or a pseudo-three-dimensional printing technique. The expression of aesthetics or texture through visual or tactile sensation by shaping (molding) is referred to as "decorating (ornamenting)."

As illustrated in FIG. 1, the sheet 10 includes a base 20 and a thermally expansive layer 30. Note that FIG. 1 illustrates a cross-section of the sheet 10 in a state prior to the shaped object being produced or, in other words, in a state in which no portions of the sheet 10 are distended. In the following, the side of the thermally expansive layer 30 is called the front side of the sheet 10, and the side of the base 20 is called the back side of the sheet 10.

The base 20 is a sheet-like medium that serves as the foundation of the sheet 10.

The base 20 is a support body that supports the thermally expansive layer 30, and is responsible for maintaining the strength of the sheet 10. Common printer paper, for example, can be used as the base 20. However, the material of the base 20 is not particularly limited and examples thereof include synthetic paper, canvas and similar fabrics, and plastic films such as polypropylene, polyethylene terephthalate (PET), and polybutylene terephthalate (PBT). The base 20 of the sheet 10 includes a first main surface 22, and a second main surface 24 on a side opposite the first main surface 22.

The thermally expansive layer 30 is laminated on the first main surface 22 of the base 20, and expands as a result of being heated to a predetermined expansion temperature or higher. The thermally expansive layer 30 includes a binder 31 and a thermally expansive material 32 dispersed in the binder 31. The binder 31 is a thermoplastic resin such as ethylene-vinylacetate polymer or acrylic polymer. Specifically, the thermally expansive material 32 comprises thermally expandable microcapsules (micropowder) having a particle size of about 5 to 50 μm. These microcapsules are formed by encapsulating, in a thermoplastic resin shell, a substance that vaporizes at a low boiling point such as propane or butane. When the thermally expansive material 32 is heated to a temperature of about 80° C. to 120° C., for example, the encapsulated substance vaporizes, and the resulting pressure causes the thermally expandable agent to foam and expand. Thus, the thermally expansive layer 30 expands according to the amount of heat absorbed. The thermally expansive material 32 is also called a foaming agent.

Figure 2:
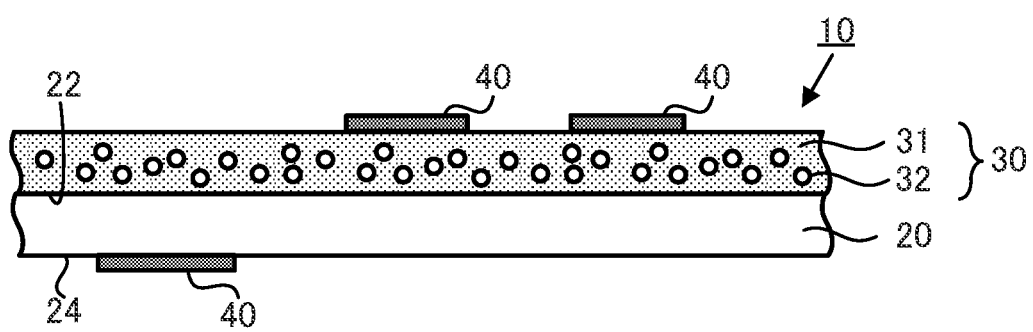
FIG. 2 is a drawing illustrating an example in which a heat conversion layer is formed on the sheet depicted in FIG. 1.

A heat conversion layer 40 that converts electromagnetic waves to heat is formed on portions of the surface of the front side or the back side of the sheet 10 to be caused to distend. FIG. 2 illustrates, as an example, a state in which the heat conversion layer 40 is formed in a portion of each of the surface of the front side (specifically, the front surface of the thermally expansive layer 30) and the surface of the back side (specifically, the second main surface 24 of the base 20) of the sheet 10. The heat conversion layer 40 is formed by printing on the surface of the front side or the back side of the sheet 10 using a printing device such as an ink jet printer or the like.

The heat conversion layer 40 converts electromagnetic waves to heat and radiates the converted heat. As a result, the thermally expansive material 32 in the thermally expansive layer 30 is heated to a predetermined temperature. The temperature to which the thermally expansive material 32 is heated can be controlled by the density of the heat conversion layer 40 formed on the surface of the front side or the back side of the sheet 10, and by the amount of energy per unit area and per unit time of the electromagnetic waves irradiated on the heat conversion layer 40. The heat conversion layer 40 converts the electromagnetic waves to heat faster than the other portions of the sheet 10. As such, the regions near the heat conversion layer 40 (the thermally expansive layer 30) are selectively heated.

Examples of the material of the heat conversion layer 40 include carbon black, metal hexaboride compounds, and tungsten oxide compounds. Carbon black, for example, absorbs and converts visible light, infrared light, and the like to heat. Metal hexaboride compounds and tungsten oxide compounds absorb and convert near-infrared light to heat.

Among the metal hexaboride compounds and the tungsten oxide compounds, lanthanum hexaboride (LaB6) and cesium tungsten oxide are preferable from the perspectives of obtaining high light absorptivity in the near-infrared region and high transmittance in the visible light spectrum.

Figure 3:
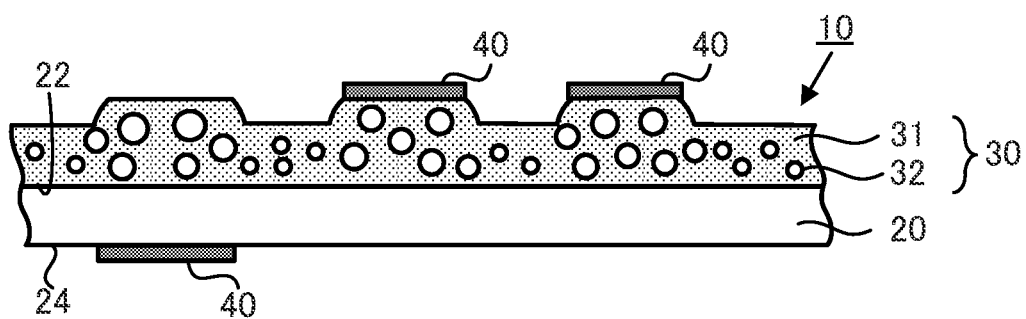
FIG. 3 is a drawing illustrating an example in which the sheet depicted in FIG. 2 is distended.

When the thermally expansive layer 30 is heated to the predetermined expansion temperature due to the heat conversion layer 40 converting the electromagnetic waves to heat, the thermally expansive material 32, of the thermally expansive material 32 included in the thermally expansive layer 30, existing at positions corresponding to the regions in which the heat conversion layer 40 is formed expands. As a result, as illustrated in FIG. 3, the portions of sheet 10 where the heat conversion layer 40 is formed rise toward the front side, and bumps are formed. A protruding or uneven shape is formed by the bumps of the thermally expansive layer 30 and, as a result, a shaped object 50 such as illustrated in FIG. 4, for example, is produced.

Shaped Object 50

The shaped object 50 is a sheet-like shaped object, and includes unevennesses 52, specifically a protrusion 54 and a recess 56, on the front surface. The shaped object 50 is used as a decorative sheet, wallpaper, or the like, for example.

Figure 4:
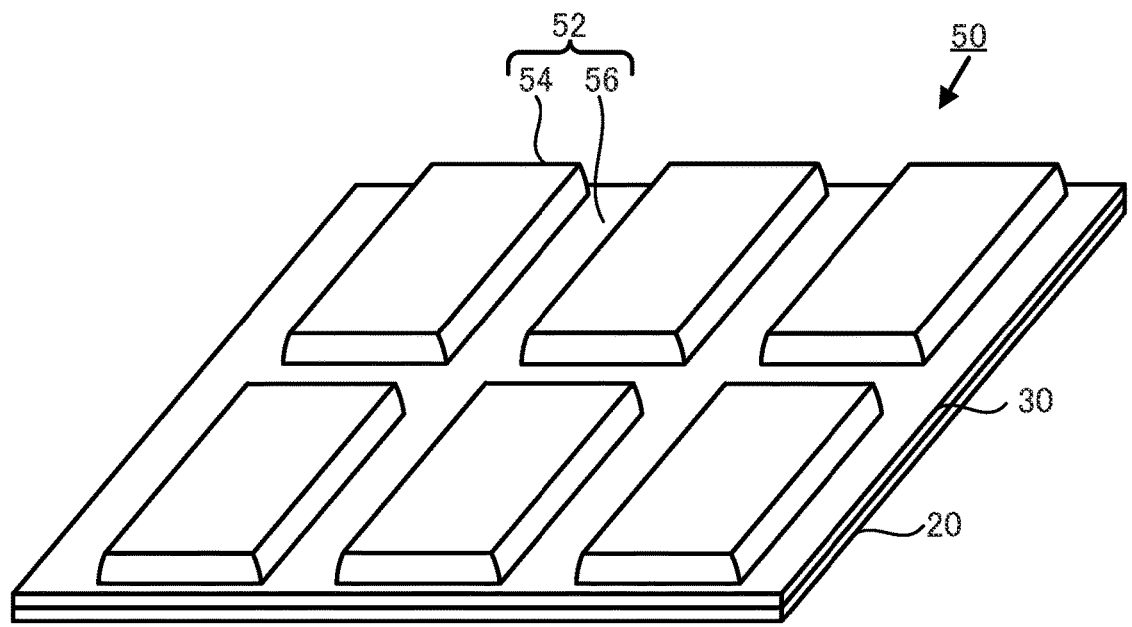
FIG. 4 is a perspective view illustrating an example of a shaped object according to Embodiment 1.

As illustrated in FIG. 4, the shaped object 50 includes the base 20, the thermally expansive layer 30 that is laminated on the first main surface 22 of the base 20 and that includes the unevennesses 52 on the side opposite the base 20, and the heat conversion layer 40 that is formed in a pattern corresponding to the unevennesses 52 on the surface of the front side or the back side of the base 20. A variety of shaped objects, including the shaped object 50, can be produced by combining regions in which and distension heights to which the sheet 10 is caused to distend.

Shaping Device 100

Next, the shaping device 100 is described. The shaping device 100 produces a shaped object 50 such as that illustrated in FIG. 4, for example, by irradiating the sheet 10 with electromagnetic waves to cause the sheet 10 to distend. When the sheet 10 is to be irradiated with the electromagnetic waves in the shaping device 100, the sheet 10 includes the base 20, the thermally expansive layer 30, and the heat conversion layer 40, as illustrated in FIG. 2.

Figure 5:
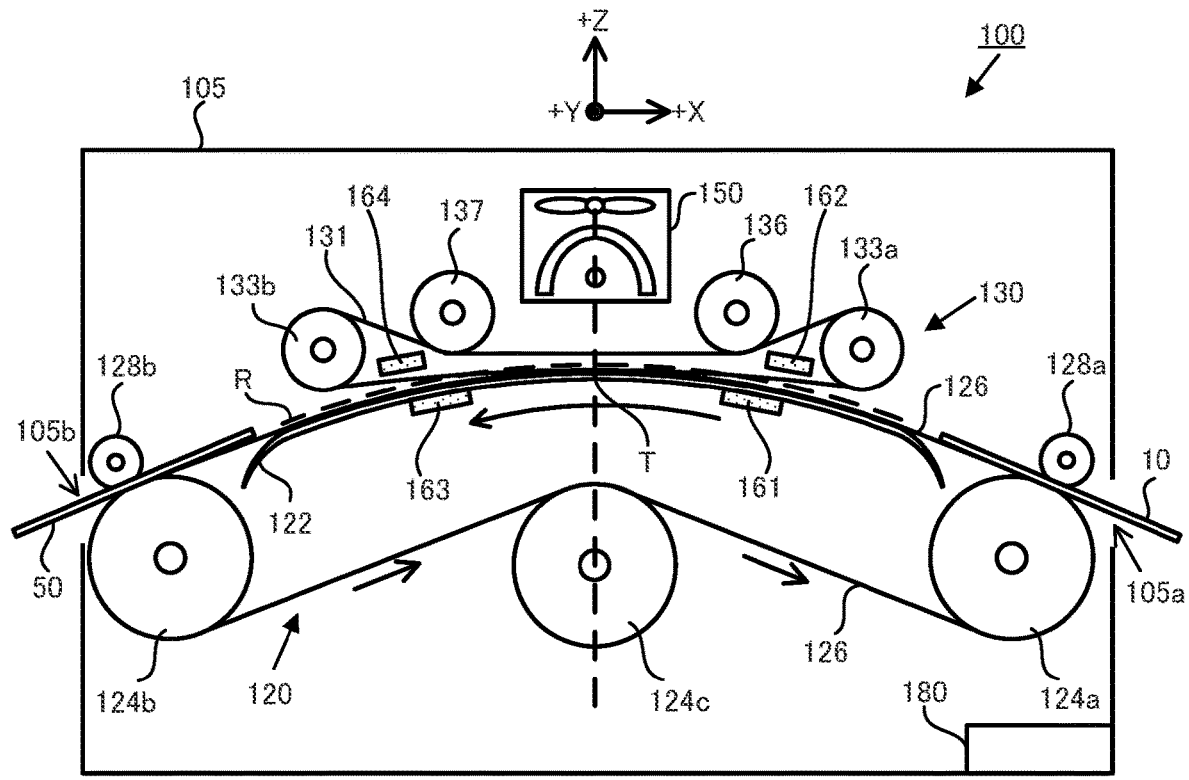
FIG. 5 is a schematic drawing illustrating a shaping device according to Embodiment 1.

As illustrated in FIG. 5, the shaping device 100 includes a conveyor 120, a tensioner 130, an irradiator 150, and a control unit 180. These constituents are provided within a housing 105. The housing 105 includes a loading port 105a through which the sheet 10 is loaded, and a discharge port 105b through which the produced shaped object 50 is discharged.

Note that, to facilitate comprehension, in the shaping device 100 of FIG. 5, the longitudinal right direction (the right direction on paper) is referred to as the "+X direction", the up direction (the up direction on paper) is referred to as the "+Z direction", and the direction perpendicular to the +X direction and the +Z direction (the front direction on paper) is referred to as the "+Y direction."

Conveyor 120

The conveyor 120 conveys the sheet 10, loaded through the loading port 105a of the housing 105, along a conveyance route R. The conveyance route R is a route leading from the loading port 105a to the discharge port 105b of the housing 105. The conveyance route R is a convexly curved route, and curves so as to protrude in the +Z direction. A position of the conveyance route R irradiated with the electromagnetic waves by the irradiator 150 is a peak T of the conveyance route R.

More specifically, the conveyor 120 includes a guide 122, a driven roller 124a, a driving roller 124b, a tension roller 124c, a conveyor belt 126, a loading roller 128a, and a discharge roller 128b.

The guide 122 is disposed between an outgoing portion and a return portion of the conveyor belt 126. Similar to the conveyance route R, the guide 122 has a shape that curves so as to protrude in the +Z direction. The guide 122 supports the outgoing portion of the conveyor belt 126 from the −Z side while curving along the convexly curved conveyance route R. Additionally, the guide 122 conducts heat with the conveyor belt 126.

The driven roller 124a is disposed on the loading port 105a side (the +X side) of the housing 105, and the conveyor belt 126 is wound on the driven roller 124a. The rotational axis of the driven roller 124a is disposed in a direction (Y direction) orthogonal to the conveyance direction (the −X direction) of the sheet 10 and the protruding direction (the +Z direction) of the conveyance route R. The driven roller 124a is axially supported by side plates of the housing 105.

The driving roller 124b is disposed on the discharge port 105b side (the −X side) of the housing 105, and the conveyor belt 126 is wound on the driving roller 124b. The rotational axis of the driving roller 124b is disposed in the Y direction, similar to the rotational axis of the driven roller 124a. The driving roller 124b is axially supported by the side plates of the housing 105. The driving roller 124b rotates counter-clockwise when viewed from the +Y direction due to the rotation of a non-illustrated motor, thereby causing the conveyor belt 126 to run.

The tension roller 124c is disposed below (on the −Z side of) the return portion of the conveyor belt 126. The tension roller 124c presses on the return portion of the conveyor belt 126 from the −Z side to apply tension to the conveyor belt 126. The rotational axis of the tension roller 124c is disposed in the Y direction, similar to the rotational axis of the driven roller 124a. The tension roller 124c is axially supported by the side plates of the housing 105.

The conveyor belt 126 is an endless belt that is wound on the driven roller 124a and the driving roller 124b. The outgoing portion of the conveyor belt 126 is supported by the guide 122 and, as such, convexly curves along the convexly curved conveyance route R. The conveyor belt 126 runs due to the rotation of the driving roller 124b. Specifically, the outgoing portion of the conveyor belt 126 runs along the conveyance route R in the −X direction, and the return portion of the conveyor belt 126 runs in the +X direction.

The conveyor belt 126 includes a conveyance surface 126a. The sheet 10 is placed on the conveyance surface 126a and conveyed. Specifically, in a case in which the heat conversion layer 40 is formed on the surface of the front side of the sheet 10, the sheet 10 is placed on the conveyor belt 126 such that the surface of the back side of the sheet 10 faces the conveyance surface 126a of the conveyor belt 126, and the surface of the front side of the sheet 10 faces upward. Meanwhile, in a case in which the heat conversion layer 40 is formed on the surface of the back side of the sheet 10, the sheet 10 is placed on the conveyor belt 126 such that the surface of the front side of the sheet 10 faces the conveyance surface 126a of the conveyor belt 126, and the surface of the back side of the sheet 10 faces upward.

The conveyor belt 126 runs due to the rotation of the driving roller 124b, thereby conveying the sheet 10 placed on the conveyor belt 126 in the −X direction along the conveyance route R from the loading port 105a of the housing 105. Moreover, the conveyor belt 126 conveys the shaped object 50, produced by the sheet 10 being irradiated with the electromagnetic waves by the irradiator 150, to the discharge port 105b of the housing 105.

Thus, the conveyor belt 126 spans from the loading port 105a side (the +X side) to the discharge port 105b side (the −X side) with respect to the irradiation position of the electromagnetic waves by the irradiator 150. Due to this configuration, the conveyor belt 126 conveys the sheet 10 from the loading port 105a to the irradiation position of the electromagnetic waves by the irradiator 150, and conveys the shaped object 50 produced by the irradiation of the electromagnetic waves to the discharge port 105b.

Similar to the driven roller 124a, the loading roller 128a is axially supported by the side plates of the housing 105. The sheet 10 inserted through the loading port 105a is sandwiched between the loading roller 128a and the conveyor belt 126, and the sheet 10 is loaded into the housing 105.

Similar to the driving roller 124b, the discharge roller 128b is axially supported by the side plates of the housing 105. The shaped object 50 produced from the sheet 10 is sandwiched between the discharge roller 128b and the conveyor belt 126, and is discharged through the discharge port 105b.

Tensioner 130

Figure 6:
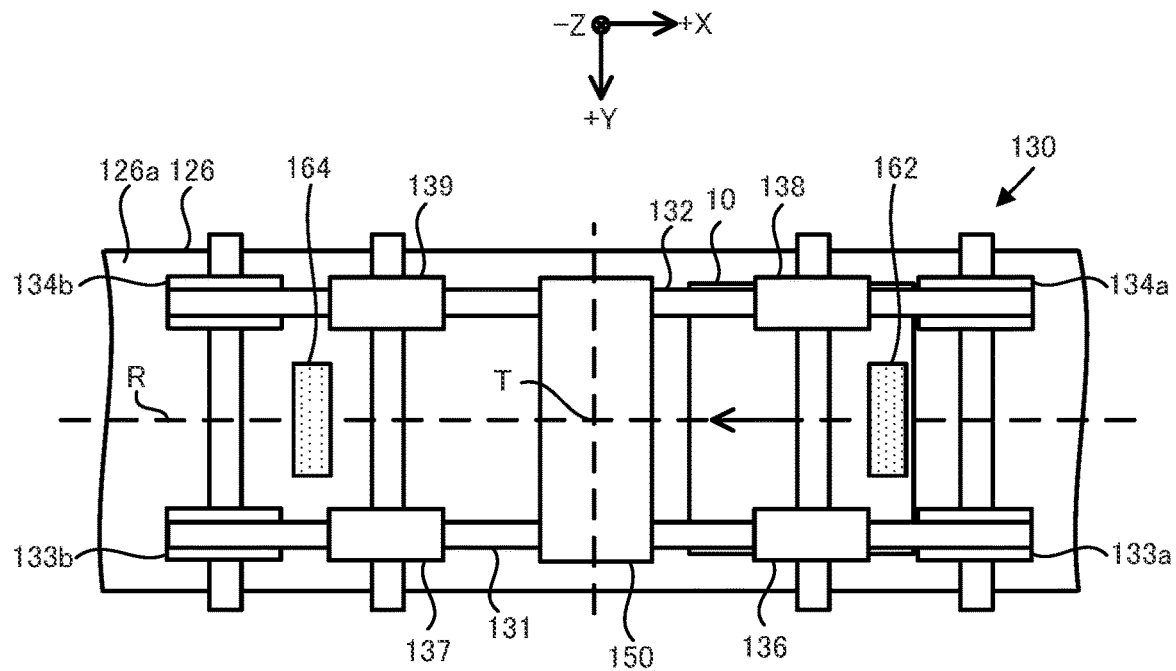
FIG. 6 is a top view illustrating a tensioner of the shaping device depicted in FIG. 5.

The tensioner 130 applies tension along the convexly curved conveyance route R to the sheet 10 being conveyed by the conveyor 120. As illustrated in FIG. 6, the tensioner 130 includes a pair of presser belts 131, 132. Each of the presser belts 131, 132 applies tension along the conveyance route R to the sheet 10 by pressing each end of the sheet 10 in the width direction of the conveyor belt 126 (the +Y direction end and the −Y direction end) against the conveyor belt 126.

More specifically, the tensioner 130 includes a first pulley 133a and a second pulley 133b on which the presser belt 131 is wound, and a third pulley 134a and a fourth pulley 134b on which the presser belt 132 is wound. Additionally, the tensioner 130 includes two bend pulleys 136, 137 that change the running direction of the presser belt 131, and two bend pulleys 138, 139 that change the running direction of the presser belt 132.

The first pulley 133a and the second pulley 133b are respectively disposed on the +X side and the −X side of the peak T of the conveyor belt 126. A lower end of an outer periphery of the first pulley 133a and a lower end of an outer periphery of the second pulley 133b are positioned more to the −Z side than the peak T of the outgoing portion of the conveyor belt 126. Accordingly, the outgoing portion of the presser belt 131 presses the +Y side end of the sheet 10 being conveyed by the conveyor belt 126 against the conveyor belt 126.

The third pulley 134a and the fourth pulley 134b are respectively disposed on the +X side and the −X side of the peak T of the conveyor belt 126. A lower end of an outer periphery of the third pulley 134a and a lower end of an outer periphery of the fourth pulley 134b are positioned more to the −Z side than the peak T of the outgoing portion of the conveyor belt 126. Accordingly, the outgoing portion of the presser belt 132 presses the −Y side end of the sheet 10 being conveyed by the conveyor belt 126 against the conveyor belt 126.

Thus, the presser belts 131, 132 respectively press the +Y side end and the −Y side end of the sheet 10 against the conveyor belt 126. As such, tension along the conveyance route R is applied to the +Y side end and the −Y side end of the sheet 10. As a result, it is possible to suppress warping, bending, and the like of the sheet 10 being conveyed by the conveyor 120.

Irradiator 150

The irradiator 150 irradiates the sheet 10, placed on and being conveyed by the conveyor belt 126, with the electromagnetic waves. As illustrated in FIG. 5, the irradiator 150 is disposed above (on the +Z side of) the peak T of the conveyor belt 126. The irradiator 150 irradiates the electromagnetic waves from above toward the surface of the upper side of the sheet 10 being conveyed by the conveyor belt 126 while tension is applied by the tensioner 130.

When the sheet 10 on which the heat conversion layer 40 is formed is irradiated with the electromagnetic waves from the irradiator 150, the heat conversion layer 40 converts the electromagnetic waves to heat and heats the thermally expansive material 32 included in the thermally expansive layer 30 to the predetermined temperature or higher. The heat conversion layer 40 is formed on the surface of the front side or the back side of the sheet 10 in a pattern corresponding to the unevennesses 52 of the shaped object 50. As such, the portions of the thermally expansive layer 30 corresponding to the protrusion 54 are heated to the predetermined temperature or higher, and the thermally expansive material 32 expands. As a result, the thermally expansive layer 30 expands and the protrusion 54 (that is, the unevennesses 52) is formed in the thermally expansive layer 30.

Figure 7:
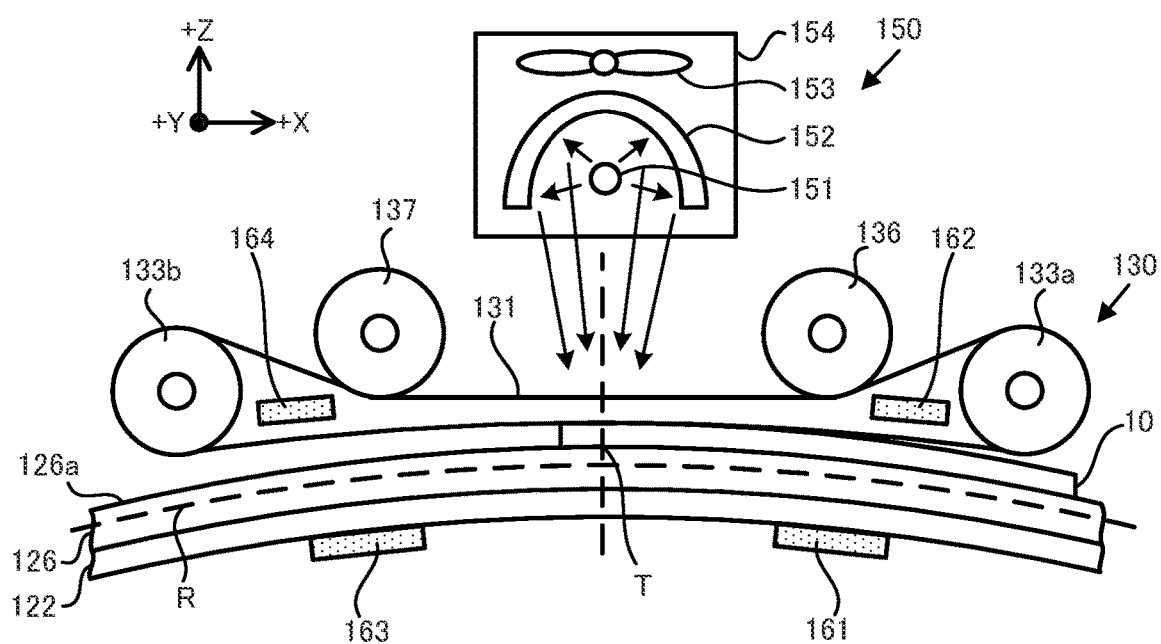
FIG. 7 is a schematic drawing illustrating, in an enlarged manner, the tensioner, an irradiator, and a heating unit of the shaping device depicted in FIG. 5.

More specifically, as illustrated in FIG. 7, the irradiator 150 includes a lamp 151, a reflector 152, a fan 153, and a cover 154.

The lamp 151 emits the electromagnetic waves. In one example, the lamp 151 is a halogen lamp, and emits electromagnetic waves in the near-infrared region (750 to 1400 nm wavelength range), the visible light spectrum (380 to 750 nm wavelength range), or the intermediate infrared region (1400 to 4000 nm wavelength range). The lamp 151 is formed in a straight pipe shape in the width direction (Y direction) of the conveyor belt 126 so as to enable the electromagnetic waves to be irradiated evenly in the width direction (Y direction) on the sheet 10 that is placed on and is being conveyed by the conveyor belt 126.

The reflector 152 reflects the electromagnetic waves emitted from the lamp 151 toward the sheet 10 that is placed on and is being conveyed by the conveyor belt 126. The reflector 152 is disposed so as to cover the lamp 151 from above. The reflector 152 reflects the electromagnetic waves emitted upward from the lamp 151 downward. The electromagnetic waves emitted from the lamp 151 and reflected by the reflection surface of the reflector 152 advance on the path indicated by the arrows in FIG. 7, and are focused on the sheet 10 that is placed on and is being conveyed by the conveyor belt 126. Thus, the electromagnetic waves emitted from the lamp 151 are reflected by the reflector 152 and, thereby focused and irradiated on the sheet 10.

The fan 153 sends air into the cover 154 to cool the lamp 151 and the reflector 152. The cover 154 accommodates the lamp 151, the reflector 152, and the fan 153.

Heating Unit (Heaters 161 to 164)

As illustrated in FIGS. 5 to 7, the shaping device 100 further includes four heaters 161 to 164. In one example, each of the heaters 161 to 164 is a heating wire heater. The heating wire heater includes a nichrome wire as the heating wire and a cover that covers the nichrome wire, and radiates, into the surroundings, heat generated when current flows through the nichrome wire. The heaters 161 to 164 functions as a heating unit that heats the conveyor belt 126.

The heaters 161 to 164 heat the conveyor belt 126 to a temperature lower than the expansion temperature of the sheet 10. In this case, the expansion temperature is the temperature at which the thermally expansive material 32 included in the thermally expansive layer 30 begins to expand and, as described above example, is a temperature of about 80° C. to 120° C., for example.

Thus, the heaters 161 to 164 heat the conveyor belt 126 that spans from the upstream side to the downstream side with respect to the irradiation position of the electromagnetic waves by the irradiator 150. As a result, the temperature environment when the sheet 10 is irradiated with the electromagnetic waves and, thereby is heated and distends can be maintained at constant conditions regardless of whether it is warm or cold, that is, whether the temperature is high or low, around the shaping device 100. In other words, the heaters 161 to 164 are responsible for heating the conveyor belt 126 to a temperature lower than the expansion temperature to adjust the temperatures of the conveyor belt 126, and the sheet 10 and the shaped object 50 conveyed by the conveyor belt 126.

More specifically, the shaping device 100 includes a first heater 161 and a second heater 162 upstream from the irradiator 150 in the conveyance direction of the conveyor belt 126. Furthermore, the shaping device 100 includes a third heater 163 and a fourth heater 164 downstream from the irradiator 150 in the conveyance direction of the conveyor belt 126.

In this case, since the conveyor belt 126 conveys the sheet 10 from the loading port 105a side (the +X side) to the discharge port 105b side (the −X side) of the housing 105, the conveyance direction of the conveyor belt 126 corresponds to from the +X side to the −X side or, rather, the −X direction. That is, upstream from the irradiator 150 in the conveyance direction of the conveyor belt 126 corresponds to farther to the +X side with respect to the position where the irradiator 150 is disposed in the shaping device 100. Likewise, downstream from the irradiator 150 in the conveyance direction of the conveyor belt 126 corresponds to farther to the −X side with respect to the position where the irradiator 150 is disposed in the shaping device 100. Hereinafter, each of the four heaters 161 to 164 is described.

The first heater 161 is disposed below the conveyance surface 126a of the conveyor belt 126, upstream from the irradiator 150 in the conveyance direction of the conveyor belt 126. Specifically, the first heater 161 is provided between the outgoing portion and the return portion of the conveyor belt 126, on the loading port 105a side (the +X side) of the housing 105.

More specifically, the first heater 161 is attached and fixed to a surface of the lower side of the guide 122 that supports the outgoing portion of the conveyor belt 126 from the lower side (the −Z side). When the first heater 161 emits heat, the guide 122 is heated and that heat transmits to the outgoing portion of the conveyor belt 126. As a result, the conveyor belt 126 is heated. The material of the guide 122 is preferably a material that has relatively high thermal conductivity such as a metal or an alloy, and is more preferably stainless steel.

The second heater 162 is disposed above the conveyance surface 126a of the conveyor belt 126, upstream from the irradiator 150 in the conveyance direction of the conveyor belt 126. Specifically, as illustrated in FIG. 6, the second heater 162 is provided between the presser belts 131, 132 provided on both ends in the width direction (Y direction) of the conveyor belt 126, on the loading port 105a side (the +X side) of the housing 105.

More specifically, the second heater 162 is attached to a non-illustrated metal plate, and is fixed at a position spaced upward from the conveyance surface 126a of the conveyor belt 126. When the second heater 162 emits heat, the conveyor belt 126 is heated by that radiant heat.

Since the first heater 161 and the second heater 162 are provided upstream from the irradiator 150, the first heater 161 and the second heater 162 apply heat to regions of the conveyor belt 126 that are upstream from the irradiation position of the electromagnetic waves by the irradiator 150. As such, the sheet 10 is placed on the conveyor belt 126 and is preheated to a temperature lower than the expansion temperature of the thermally expansive layer 30 while being conveyed from the loading port 105a to the irradiation position of the electromagnetic waves. Due to this, when irradiating with the electromagnetic waves by the irradiator 150, the time required for the temperature of the sheet 10 to reach the predetermined expansion temperature or higher can be shortened and, as such, it is easier to cause the sheet 10 to distend.

The third heater 163 is disposed below the conveyance surface 126a of the conveyor belt 126, downstream from the irradiator 150 in the conveyance direction of the conveyor belt 126. Specifically, the third heater 163 is provided between the outgoing portion and the return portion of the conveyor belt 126, on the discharge port 105b side (the −X side) of the housing 105.

More specifically, the third heater 163 is attached and fixed to a surface of the lower side of the guide 122 that supports the outgoing portion of the conveyor belt 126 from the lower side (the −Z side). When the third heater 163 emits heat, the guide 122 is heated and that heat transmits to the outgoing portion of the conveyor belt 126. As a result, the conveyor belt 126 is heated.

The fourth heater 164 is disposed above the conveyance surface 126a of the conveyor belt 126, downstream from the irradiator 150 in the conveyance direction of the conveyor belt 126. Specifically, as illustrated in FIG. 6, the fourth heater 164 is provided between the presser belts 131, 132 provided on both ends in the width direction (Y direction) of the conveyor belt 126, on the discharge port 105b side (the −X side) of the housing 105.

More specifically, the fourth heater 164 is attached to a non-illustrated metal plate, and is fixed at a position spaced upward from the conveyance surface 126a of the conveyor belt 126. When the fourth heater 164 emits heat, the conveyor belt 126 is heated by that radiant heat.

Since the third heater 163 and the fourth heater 164 are provided downstream from the irradiator 150, the third heater 163 and the fourth heater 164 apply heat to regions of the conveyor belt 126 that are downstream from the irradiation position of the electromagnetic waves by the irradiator 150. As such, the shaped object 50, produced by heating and causing the sheet 10 to distend by the irradiation of the electromagnetic waves, is conveyed from the irradiation position of the electromagnetic waves to the discharge port 105b while being held at a constant temperature. Due to this, it is possible to prevent sudden temperature differences from occurring between the newly produced shaped object 50 and the surrounding environment and, as a result, the formation of condensation can be suppressed.

Control Unit 180

Figure 8:
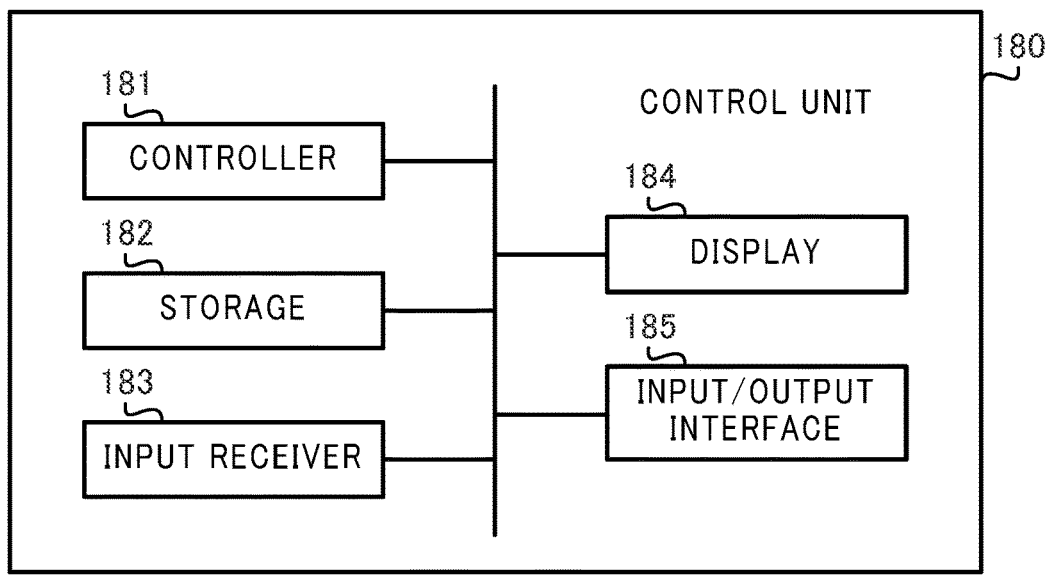
FIG. 8 is a block diagram illustrating the configuration of a control unit of the shaping device depicted in FIG. 5.

Returning to FIG. 5, the control unit 180 controls the operations of the various components of the shaping device 100, including the conveyor 120, the irradiator 150, and the heaters 161 to 164 described above. As illustrated in FIG. 8, the control unit 180 includes a controller 181, a storage 182, an input receiver 183, a display 184, and an input/output interface 185. Each of these components is connected to a bus for transmitting signals.

The controller 181 includes a central processing unit (CPU), read only memory (ROM), and random access memory (RAM). In one example, the CPU is a microprocessor or the like and is a central processing unit that executes a variety of processing and computations. In the controller 181, the CPU reads a control program stored in the ROM and controls the operations of the entire shaping device 100 while using the RAM as working memory. The controller 181 sends control commands via the input/output interface 185 to the various components, namely the conveyor 120, the irradiator 150, and the heaters 161 to 164, and causes these various components to operate.

The storage 182 is nonvolatile memory such as flash memory or a hard disk. Data and programs to be executed by the controller 181 are stored in the storage 182.

The input receiver 183 includes an input device such as various types of buttons, a touch pad, a touch panel, or the like, and receives operation inputs (user operations) from a user. For example, the user can set the type of shaped object 50 to be produced, the type of sheet 10 to be used to produce that shaped object 50, or the like by operating the input receiver 183.

The display 184 includes a display device such as a liquid crystal display, an organic electro luminescence (EL) display, or the like, and displays various images on the basis of commands from the controller 181. For example, the display 184 displays a setting screen for producing the shaped object 50 on the sheet 10.

The input/output interface 185 is an interface for inputting and outputting signals sent and received to and from the controller 181 and the various components of the shaping device 100.

Production Processing of Shaped Object

Figure 9:
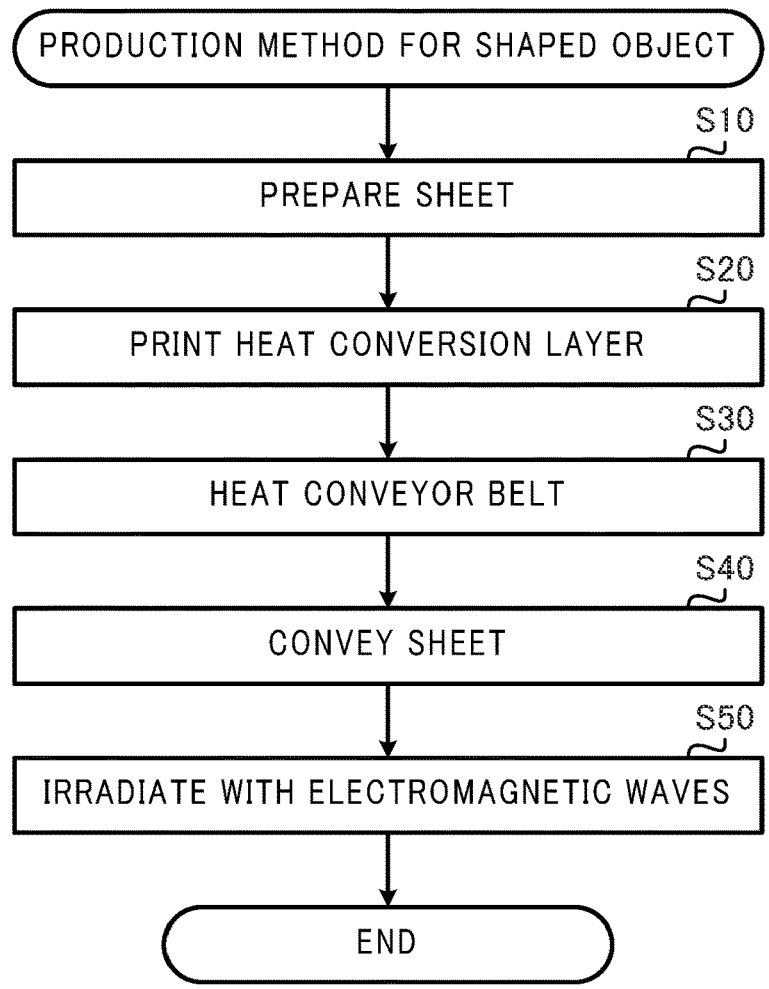
FIG. 9 is a flowchart illustrating the flow of production processing of the shaped object according to Embodiment 1.

Next, the flow of production processing of the shaped object 50 is described while referencing the flowchart illustrated in FIG. 9.

When the production processing of the shaped object 50 illustrated in FIG. 9 starts, firstly, the sheet 10 is prepared (step S10). Specifically, a coating liquid obtained by mixing the binder 31 and the thermally expansive material 32 is screen printed on the first main surface 22 of the base 20, and the printed coating liquid is dried. As a result, a sheet 10 such as illustrated in FIG. 1 in which the thermally expansive layer 30 is laminated on the first main surface 22 of the base 20 is produced.

After the sheet 10 is prepared, the heat conversion layer 40 is printed on the prepared sheet 10 (step S20). Specifically, a printing device prints ink containing the heat conversion material in a gray-scale pattern corresponding to the unevennesses 52 on at least one of the surface of the front side (that is, the front surface of the thermally expansive layer 30) of the sheet 10 or the surface of the back side (that is, the second main surface 24 of the base 20) of the sheet 10. In one example, the printing device is an ink jet printer.

When the heat conversion layer 40 is printed on the sheet 10, the heaters 161 to 164 functioning as heating units heat the conveyor belt 126 (step S30). Specifically, the heaters 161 to 164 operate on the basis of commands from the controller 181 and heat the conveyor belt 126 to a temperature lower than the expansion temperature of the sheet 10.

When the conveyor belt 126 is heated, the sheet 10 is placed on the heated conveyor belt 126 and conveyed (step S40). Specifically, the user inserts the sheet 10, on which the heat conversion layer 40 is printed, through the loading port 105a of the shaping device 100. In a case in which the heat conversion layer 40 is printed on the surface of the front side of the sheet 10, the user inserts the sheet 10 through the loading port 105a with the surface of the front side facing upward. In a case in which the heat conversion layer 40 is printed on the surface of the back side of the sheet 10, the user inserts the sheet 10 through the loading port 105a with the surface of the back side facing upward. The conveyor 120 operates on the basis of the control of the controller 181 and causes the driving roller 124b to rotate, thereby causing the conveyor belt 126 that is heated by the heaters 161 to 164 to run. As a result, the conveyor belt 126 conveys the inserted sheet 10 along the conveyance route R.

When the sheet 10 is conveyed, the sheet 10 being conveyed is irradiated with the electromagnetic waves (step S50). Specifically, the irradiator 150 operates on the basis of the control of the controller 181, and emits the electromagnetic waves toward the sheet 10 that is being conveyed by the conveyor 120. As a result, the heat conversion layer 40 printed on the sheet 10 converts the electromagnetic waves to heat, thereby generating heat. When the thermally expansive material 32 included in the thermally expansive layer 30 is heated by the heat emitted from the heat conversion layer 40 to the temperature at which expansion starts, the thermally expansive layer 30 starts to expand and the unevennesses 52 are formed. As a result, the shaped object 50 is produced.

Thus, the shaped object 50 is produced from the sheet 10. The produced shaped object 50 is conveyed along the conveyance route R by the conveyor 120, and discharged through the discharge port 105b of the shaping device 100. At this time, as desired, a color image may be printed by a printing device on the surface of the front side or the surface of the back side of the sheet 10 in order to enhance the decorativeness of the produced shaped object 50.

Note that, in cases in which the heat conversion layer 40 is printed on both the surface of the front side and the surface of the back side of the sheet 10 to cause the sheet 10 to distend, the heat conversion layer 40 is printed on each of the surface of the front side and the surface of the back side, and the processing of steps S20 to S50 is repeated.

As described above, the shaping device 100 according to Embodiment 1 includes the conveyor belt 126 on which the sheet 10, which distends due to being irradiated with electromagnetic waves, is placed and conveyed, the irradiator 150 that irradiates the electromagnetic waves on the sheet 10 that is placed on the conveyor belt 126 and is being conveyed, and the heaters 161 to 164 that heat the conveyor belt 126. Thus, the shaping device 100 according to Embodiment 1 heats uses the heaters 161 to 164 to heat the conveyor belt 126 on which the sheet 10 is placed and conveyed. As such, when the sheet 10 is irradiated with the electromagnetic waves by the irradiator 150, effects of the surrounding environment of the shaping device 100 can be reduced, and the sheet 10 can be caused to distend in a stable temperature environment. As a result, it is possible to form the unevennesses 52 in the sheet 10 with high precision, which leads to producing the desired shaped object 50 with high precision.

In particular, the shaping device 100 according to Embodiment 1 includes the first heater 161 and the second heater 162 upstream from the irradiator 150 in the conveyance direction of the conveyor belt 126. Due to this, the sheet 10 is pre-heated prior to being irradiated with the electromagnetic waves. As a result, when irradiating with the electromagnetic waves by the irradiator 150, the time required for the temperature of the sheet 10 to reach the predetermined expansion temperature or higher can be shortened. As such, it is easier to cause the sheet 10 to distend. Note that, in addition to using the various heaters to preheat the conveyor belt 126 in advance, the various heaters may be used to heat the sheet 10 and the conveyor belt 126 while conveying the sheet 10. That is, in addition to using the various heaters to heat the conveyor belt 126 in advance, the second heater 162, the fourth heater 164, and the like, may be used to directly heat the sheet 10 without involving the guide or the belt.

Furthermore, the shaping device 100 according to Embodiment 1 includes the third heater 163 and the fourth heater 164 downstream from the irradiator 150 in the conveyance direction of the conveyor belt 126. Due to this, the region of the conveyor belt 126 conveying the shaped object 50 produced from the sheet 10 is heated and, therefore, the shaped object 50, which is produced by heating the sheet 10 to the predetermined expansion temperature or higher, does not suddenly cool. As a result, the formation of condensation on the shaped object 50 can be suppressed.

Embodiment 2

Next, Embodiment 2 of the present disclosure is described. In Embodiment 2, as appropriate, descriptions of configurations and functions that are the same as described in Embodiment 1 are forgone.

The shaping device 100 according to Embodiment 1 includes the heaters 161 to 164 that heat the conveyor belt 126. However, in some cases, the temperature of the conveyor belt 126 cannot be stabilized with only the heating by the heaters 161 to 164. For example, the temperature of the conveyor belt 126 may continue to rise. If the temperature of the conveyor belt 126 is not stable, there is a possibility that the bumps cannot be appropriately formed due to the sheet 10 distending excessively, the boundaries between the protrusions and the recesses becoming unclear, or the like. As such, in Embodiment 2, the temperature of the conveyor belt 126 that is heated by the heaters 161 to 164 is adjusted so as to maintain suitable temperature conditions.

Figure 10:
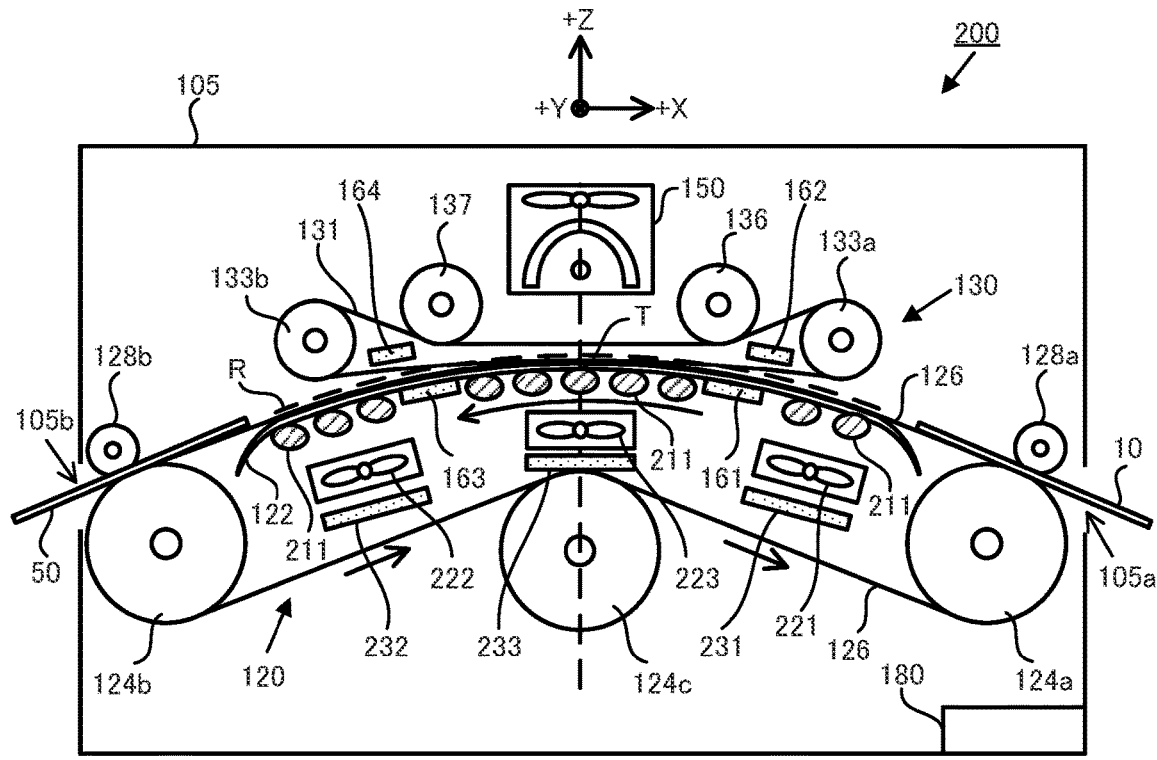
FIG. 10 is a schematic drawing illustrating a shaping device according to Embodiment 2 of the present disclosure.

FIG. 10 illustrates the configuration of a shaping device 200 according to Embodiment 2. The shaping device 200 includes the conveyor 120, the tensioner 130, the irradiator 150, the heaters 161 to 164, and the control unit 180. These components are the same as those of the shaping device 100 according to Embodiment 1 and, as such, descriptions thereof are foregone.

In addition to the components that are the same as in Embodiment 1, the shaping device 200 according to Embodiment 2 further includes a piping 211 for circulating water, and fans 221 to 223 that blow air. Note that, in FIG. 10, to facilitate comprehension, only a portion of the piping 211 is denoted with a reference numeral. However, all of the portion marked by diagonal lines in FIG. 10 represents a cross-section of the piping 211.

Piping 211

The piping 211 functions as a first temperature adjuster that adjusts, using water that flows in the piping 211, the temperature of the conveyor belt 126 that is heated by the heaters 161 to 164. As illustrated in FIG. 10, the piping 211 is disposed so as to pass through the inner side of the conveyor belt 126. In this case, the inner side of the conveyor belt 126 corresponds to between the outgoing portion and the return portion of the conveyor belt 126. The piping 211 circulates cold water or hot water on the inner side of the conveyor belt 126 to cool or heat the conveyor belt 126. The water that flows inside the piping 211 is an example of a thermal medium.

More specifically, the piping 211 is attached to the lower surface of the guide 122, which is below the conveyance surface 126a of the conveyor belt 126. In this case, as in Embodiment 1, the guide 122 is a member that supports the conveyor belt 126. The upper surface of the guide 122 contacts the lower surface of the conveyor belt 126. Since the piping 211 is attached to the guide 122, when the cold water or hot water flows through the piping 211, the guide 122 is cooled or heated first. When the guide 122 is cooled or heated, the heat of the guide 122 transmits to the conveyor belt 126, and the conveyor belt 126 is cooled or heated.

Figure 11:
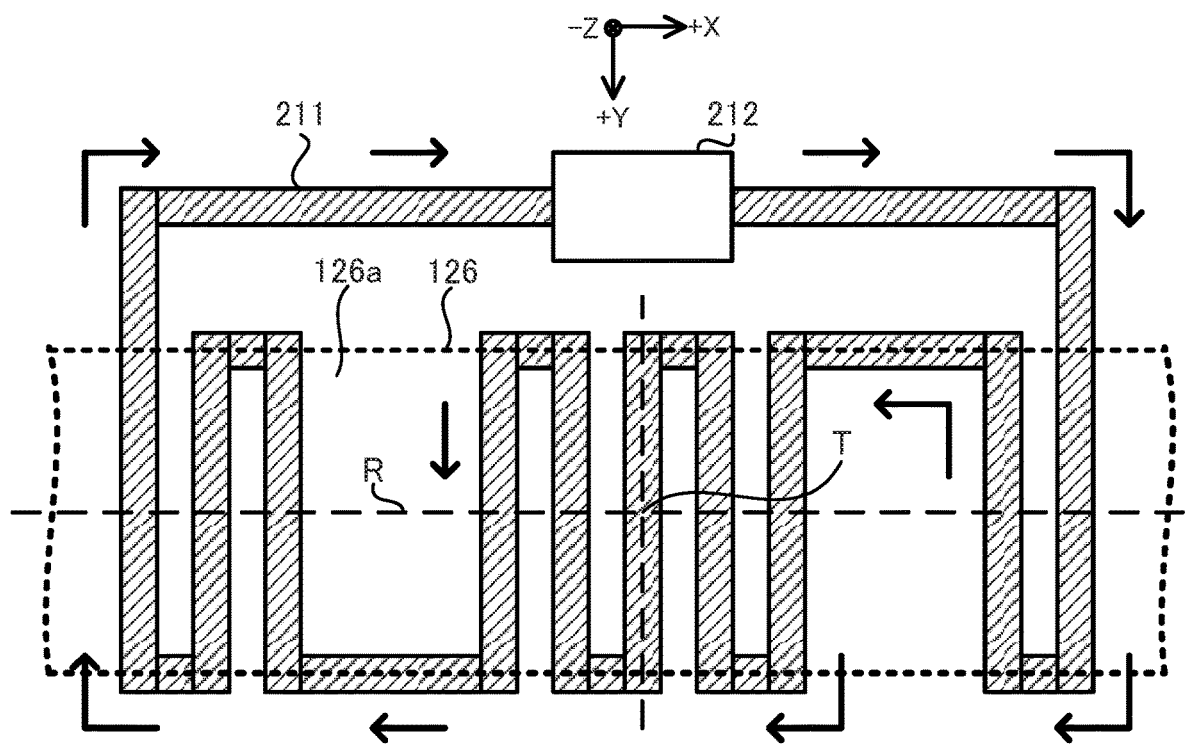
FIG. 11 is a top view illustrating an installation example of piping in the shaping device according to Embodiment 2.

FIG. 11 illustrates an arrangement example of the piping 211 disposed below the conveyance surface 126a, viewed from above (the +Z direction). In FIG. 11, to facilitate comprehension, the position of the conveyance surface 126a of the conveyor belt 126 is indicated by dashed lines, and the tensioner 130, the irradiator 150, and the other components are omitted.

The piping 211 is routed on the lower surface of the guide 122 so as to be distributed across a wide area of the conveyor belt 126 from upstream to downstream in the conveyance direction of the conveyor belt 126. As in Embodiment 1, in this case, the conveyance direction of the conveyor belt 126 corresponds to from the +X side to the −X side, that is, the −X direction.

More specifically, on the inner side of the conveyor belt 126, the piping 211 passes at least positions upstream and downstream from the irradiator 150 in the conveyance direction of the conveyor belt 126, and a position facing the irradiator 150 across the conveyance surface 126a of the conveyor belt 126. The piping 211 is disposed so as to go out and return at least one time in the width direction (the Y direction) of the conveyor belt 126 at each of farther upstream than the first heater 161, farther downstream than the third heater 163, and between the first heater 161 and the third heater 163.

Additionally, as illustrated in FIG. 11, the shaping device 200 further includes a water supplier 212 that supplies water to the piping 211. The water supplier 212 is disposed at an appropriate position such as to the side of or below the conveyor belt 126, inside the housing 105, or outside the housing 105. Note that, it is preferable that the water supplier 212 is disposed outside the housing 105 in order to prevent the effects of the heat of the water supplier 212 itself that is generated as a result of the water supplier 212 operating.

The water supplier 212 includes a function for cooling water to produce cold water, and a function for heating water to produce hot water. The water supplier 212 mixes the produced cold water and hot water to produce water having a temperature adjusted to a desired temperature, and supplies the temperature-adjusted water to the piping 211. The piping 211 circulates the water supplied from the water supplier 212. Note that the type of the water supplier 212 is not particularly limited provided that the water supplier 212 can perform temperature adjustment from cold water to hot water. Examples thereof include air-cooled and water-cooled types.

When cold water or hot water is supplied from the water supplier 212 to the piping 211, as illustrated by the arrows in FIG. 11, the cold water or hot water is firstly fed to the upstream side in the conveyance direction, and flows so as to repeatedly cross the conveyor belt 126 on the upstream side. Thereafter, the cold water or hot water in the piping 211 is fed from the upstream side to a center section and the downstream side, and flows so as to repeatedly cross the conveyor belt 126 at the center section and on the downstream side.

Thus, the cold water or hot water in the piping 211 repeatedly goes out and returns in the width direction of the conveyor belt 126, thereby making it possible to carry out temperature adjustments more efficiently.

More specifically, the water supplier 212 drives on the basis of the control of the controller 181 of the control unit 180, and adjusts the temperature of the water supplied to the piping 211 in accordance with the temperature of the conveyor belt 126 heated by the heaters 161 to 164. Specifically, when the temperature of the conveyor belt 126 heated by the heaters 161 to 164 is higher than a reference temperature, the water supplier 212 cools the conveyor belt 126 by supplying cold water to the piping 211. When the temperature of the conveyor belt 126 heated by the heaters 161 to 164 is lower than the reference temperature, the water supplier 212 heats the conveyor belt 126 by supplying hot water to the piping 211.

In this case, the reference temperature is a temperature of the conveyor belt 126 that causes the sheet 10 to suitably distend, and is preset to an appropriate temperature such as 55° C. or the like. Note that the reference temperature is not limited to one temperature, and may be a certain range such as, for example, from 52° C. to 58° C.

Here, the temperature of the conveyor belt 126 is measured by a non-illustrated temperature sensor. In one example, the temperature sensor is a contact-type sensor that senses the temperature using a thermocouple. The temperature sensor may be provided at any position where it is possible to measure the temperature of the conveyor belt 126. In one example, the temperature sensor is provided at a position heated by the first heater 161 and the second heater 162, below the conveyance surface 126a of the conveyor belt 126. Note that the temperature sensor is not limited to being provided at one location, and may be provided at a plurality of locations. Information of the temperature measured by the temperature sensor is supplied to the control unit 180 via a non-illustrated communication line. The controller 181 of the control unit 180 adjusts, in accordance with the temperature measured by the temperature sensor, the temperature of the water to be supplied to the piping 211 from the water supplier 212.

Note that the temperature sensor is not limited to a contact-type sensor, and may be a non-contact-type sensor. In a case in which the temperature sensor is a non-contact-type sensor, the temperature sensor is, for example, an infrared sensor that senses the temperature of the conveyance surface 126a of the conveyor belt 126 by infrared rays. In such a case, the temperature sensor is disposed at a position facing the conveyance surface 126a so as to be able to sense the temperature of the conveyance surface 126a. The temperature sensor may be provided at a plurality of locations instead of at one location.

The water supplier 212 lowers the temperature of the water to be supplied to the piping 211 when the temperature of the conveyor belt 126 heated by the heaters 161 to 164 is higher, and raises the temperature of the water to be supplied to the piping 211 when the temperature of the conveyor belt 126 heated by the heaters 161 to 164 is lower. Due to this, the piping 211 circulates colder water when the temperature of the conveyor belt 126 is higher, and circulates hotter water when the temperature of the conveyor belt 126 is lower.

Figure 12:
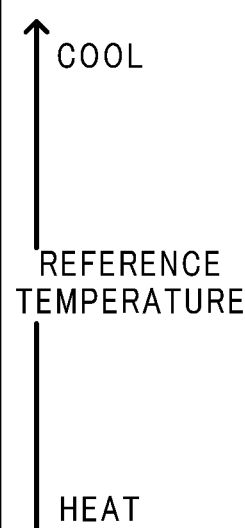
FIG. 12 is a drawing illustrating an example of a temperature adjustment table of Embodiment 2.

Specifically, the water supplier 212 references the temperature adjustment table illustrated in FIG. 12 to determine the temperature of the water to be supplied to the piping 211. The temperature adjustment table illustrated in FIG. 12 illustrates, as one example, the correspondence between the temperature of the conveyor belt 126 and the water temperature inside the piping 211 when the reference temperature is 55° C. The temperature adjustment table is set in advance, and is stored in the storage 182.

For example, in a case in which the temperature of the conveyor belt 126 is 60° C., which is 5° C. higher than the reference temperature, the water supplier 212 adjusts the temperature of the water to be supplied to the piping 211 to 50° C. by lowering the temperature of the water by 5° C. In a case in which the temperature of the conveyor belt 126 is 65° C., which is 10° C. higher than the reference temperature, the water supplier 212 adjusts the temperature of the water to be supplied to the piping 211 to 45° C. by lowering the temperature of the water by 10° C. In a case in which the temperature of the conveyor belt 126 is 70° C., which is 15° C. higher than the reference temperature, the water supplier 212 adjusts the temperature of the water to be supplied to the piping 211 to 40° C. by lowering the temperature of the water by 15° C.

In a case in which the temperature of the conveyor belt 126 is 50° C., which is 5° C. lower than the reference temperature, the water supplier 212 adjusts the temperature of the water to be supplied to the piping 211 to 60° C. by raising the temperature of the water to be supplied to the piping 211 by 5° C. In a case in which the temperature of the conveyor belt 126 is 45° C., which is 10° C. lower than the reference temperature, the water supplier 212 adjusts the temperature of the water to be supplied to the piping 211 to 65° C. by raising the temperature of the water to be supplied to the piping 211 by 10° C. In a case in which the temperature of the conveyor belt 126 is 40° C., which is 15° C. lower than the reference temperature, the water supplier 212 adjusts the temperature of the water to be supplied to the piping 211 to 70° C. by raising the temperature of the water to be supplied to the piping 211 by 15° C.

Thus, in cases in which the temperature of the conveyor belt 126 has risen or decreased, the water supplier 212 lowers or raises the temperature of the water to be supplied to the piping 211 an amount corresponding to the rise or decrease of the temperature. As a result, the temperature of the conveyor belt 126 can be maintained at the reference temperature. In particular, the temperature may rise excessively when attempting to heat the conveyor belt 126 to the reference temperature using the heaters. As such, in cases in which the temperature of the conveyor belt 126 is lower than the reference temperature, the temperature adjuster can adjust the temperature more accurately than when adjusting the temperature using the heaters.

Fans 221 to 223

Returning to FIG. 10, the fans 221 to 223 blow toward the conveyor belt 126, thereby functioning as a second temperature adjuster that adjusts the temperature of the conveyor belt 126 that is heated by the heaters 161 to 164. The fans 221 to 223 are disposed on the inner side of the conveyor belt 126, facing up toward the lower surface of the guide 122. The fans 221 to 223 blow cold air or hot air toward the conveyor belt 126 to cool or heat the conveyor belt 126.

A first fan 221 is disposed upstream from the irradiator 150 in the conveyance direction of the conveyor belt 126. More specifically, the first fan 221 is disposed below the guide 122 farther upstream than the first heater 161.

A second fan 222 is disposed downstream from the irradiator 150 in the conveyance direction of the conveyor belt 126. More specifically, the second fan 222 is disposed below the guide 122 farther downstream than the third heater 163.

A third fan 223 is disposed at a position facing the irradiator 150 across the conveyance surface 126a of the conveyor belt 126. More specifically, the third fan 223 is disposed below the peak T of the conveyance route R.

The fans 221 to 223 are driven on the basis of control of the controller 181, and blow air from below the guide 122. As a result, the temperature of the guide 122 is adjusted, thereby further adjusting the temperature of the conveyor belt 126 via the guide 122. The three fans 221 to 223 are disposed upstream, downstream, and in the center section of the conveyor belt 126. As such, it is possible to adjust the temperature of the conveyor belt 126 so as to maintain the temperature of the entire conveyor belt 126 as constantly as possible.

As illustrated in FIG. 10, the shaping device 200 further includes fan heaters 231 to 233. The fan heaters 231 to 233 heat the air to be blown by the fans 221 to 223.

More specifically, the fan heaters 231 to 233 are respectively disposed below the fans 221 to 223, that is, on the windward side of the fans 221 to 223. When driven by commands from the controller 181, the fan heaters 231 to 233 heat the air on the windward side of the fans 221 to 223. When the fans 221 to 223 are driven while the fan heaters 231 to 233 heat the air, hot air is blown on the guide 122. As a result, the conveyor belt 126 is heated. Meanwhile, if the fans 221 to 223 are driven while the fan heaters 231 to 233 are not driven, cold air is blown on the guide 122. As a result, the conveyor belt 126 is cooled.

The fans 221 to 223 and the fan heaters 231 to 233 are driven of the basis of control of the controller 181 of the control unit 180, and adjust, in accordance with the temperature of the conveyor belt 126 heated by the heaters 161 to 164, the temperature of the air to be blown.

Here, the temperature of the conveyor belt 126 is measured by the same temperature sensor used in the temperature adjusting by the piping 211. The controller 181 controls the fans 221 to 223 and the fan heaters 231 to 233 in accordance with the temperature of the conveyor belt 126 measured by the temperature sensor.

Specifically, in a case in which the temperature of the conveyor belt 126 heated by the heaters 161 to 164 is higher than the reference temperature, the controller 181 causes the fans 221 to 223 to blow without driving the fan heaters 231 to 233. As a result, the fans 221 to 223 blow cold air toward the conveyor belt 126 and cool the conveyor belt 126 to the reference temperature.

Meanwhile, in a case in which the temperature of the conveyor belt 126 heated by the heaters 161 to 164 is lower than the reference temperature, the controller 181 drives the fan heaters 231 to 233 and also causes the fans 221 to 223 to blow. As a result, the fans 221 to 223 blow air heated by the fan heaters 231 to 233 toward the conveyor belt 126 and heat the conveyor belt 126 to the reference temperature.

More specifically, when cooling the conveyor belt 126, the controller 181 changes the number of rotations per unit time of the fans 221 to 223 in accordance with the temperature of the conveyor belt 126 measured by the temperature sensor, thereby adjusting the strength of the blowing. Specifically, in cases in which the temperature of the conveyor belt 126 is higher, the number of rotations per unit time of the fans 221 to 223 is increased and the fans 221 to 223 blow stronger. In cases in which the temperature of the conveyor belt 126 is lower, the number of rotations per unit time of the fans 221 to 223 is decreased and the fans 221 to 223 blow weaker.

Thus, the temperature of the conveyor belt 126 can be maintained at the reference temperature by controlling the number of rotations per unit time of the fans 221 to 223. Note that the correspondence between the temperature of the conveyor belt 126 and the number of rotations per unit time is predetermined in a manner similar to the temperature adjustment table illustrated in FIG. 12, and is stored in the storage 182. When both heating and cooling, non-illustrated vents, fans, and the like are appropriately provided so that the heated air is not trapped in the housing 105, and the temperature can be more precisely adjusted by venting the heated air out of the housing 105.

As described above, the shaping device 200 according to Embodiment 2 includes the piping 211 that circulates water and the fans 221 to 223 that blow air as temperature adjusters that adjust the temperature of the conveyor belt 126 heated by the heaters 161 to 164. Due to this, the temperature of the conveyor belt 126 can be prevented from rising excessively or decreasing excessively, and the sheet 10 can be caused to distend in a more stable temperature environment. As a result, it is possible to form the unevennesses 52 in the sheet 10 with high precision, which leads to producing the desired shaped object 50 with high precision.

MODIFIED EXAMPLES

Embodiments of the present disclosure are described above, but these embodiments are merely examples and do not limit the scope of application of the present disclosure. That is, various applications of the embodiments of the present disclosure are possible, and all embodiments are included in the scope of the present disclosure.

For example, in Embodiments 1 and 2, the shaping device 100, 200 includes, as the heating unit that heats the conveyor belt 126, the four heaters 161 to 164. However, it is sufficient that the shaping device 100, 200 includes, as the heating unit, at least one heater that heats the conveyor belt 126. In this case, the position at which the at least one heater is disposed may be upstream or downstream with respect to the irradiator 150, and may be above or below the conveyance surface 126a. When any position of the conveyor belt 126 is heated by the at least one heater, the heat from the heating transmits to the interior of the conveyor belt 126 and, as a result, the entire conveyor belt 126 is warmed. Accordingly, it is possible to maintain, at constant conditions, the temperature environment when irradiating the sheet 10 with the electromagnetic waves, and the sheet 10 can be caused to distend in a stable temperature environment.

In Embodiment 2, the shaping device 200 includes, as the temperature adjuster, the piping 211 and the fans 221 to 223. However, a configuration is possible in which the shaping device 200 includes, as the temperature adjuster, only one of the piping 211 and the fans 221 to 223. Including both of these components allows the shaping device 200 to more effectively adjust the temperature of the conveyor belt 126. For example, it is preferable that devices such as large heaters that generate a relatively large amount of heat include both the piping 211 and the fans 221 to 223 because such a configuration enables more effective cooling. However, it is possible to adjust the temperature of the conveyor belt 126 that is heated by the heaters 161 to 164 using only one of the piping 211 and the fans 221 to 223. It is preferable that devices such as small heaters that generate a relatively small amount of heat include only one of the piping 211 and the fans 221 to 223 because such a configuration enables temperature adjustments to be carried out in a manner that is sufficiently effective.

In Embodiment 2, the shaping device 200 includes the three fans 221 to 223 on the inner side of the conveyor belt 126. However, the fans 221 to 223 are not limited to being provided on the inner side of the conveyor belt 126, and may be provided at any position provided that the fans 221 to 223 can blow air on the conveyor belt 126. Additionally, the number of the fans is not limited to three. The fan heaters 231 to 233 are not limited to being disposed on the windward side of the fans 221 to 223, and may be disposed on the downwind side of the fans 221 to 223 provided that the fan heaters 231 to 233 can heat the air blown by the fans 221 to 223. Additionally, the piping 211 is not limited to being disposed so as to go out and return along the width direction of the conveyor belt 126, as illustrated in FIG. 11. For example, a configuration is possible in which the piping 211 is disposed so as to go out and return along the conveyance direction of the conveyor belt 126.

In Embodiment 2, the piping 211 circulates water to adjust the temperature of the conveyor belt 126 that is heated by the heaters 161 to 164. However, the thermal medium flowing inside the piping 211 is not limited to water, and may be a liquid other than water or a gas. For example, a configuration is possible in which a thermal medium supplier corresponding to the water supplier 212 supplies and circulates, as the thermal medium, a liquid other than water or a gas that corresponds to the appropriate use temperature to the piping 211, thereby heating or cooling the conveyor belt 126 that is heated by the heaters 161 to 164.

In Embodiments 1 and 2, the conveyor 120 conveys the sheet 10 along the conveyance route R that is convexly curved. However, the conveyor 120 may convey the sheet 10 along any conveyance route, not only the convexly curved conveyance route R.

Figure 13:
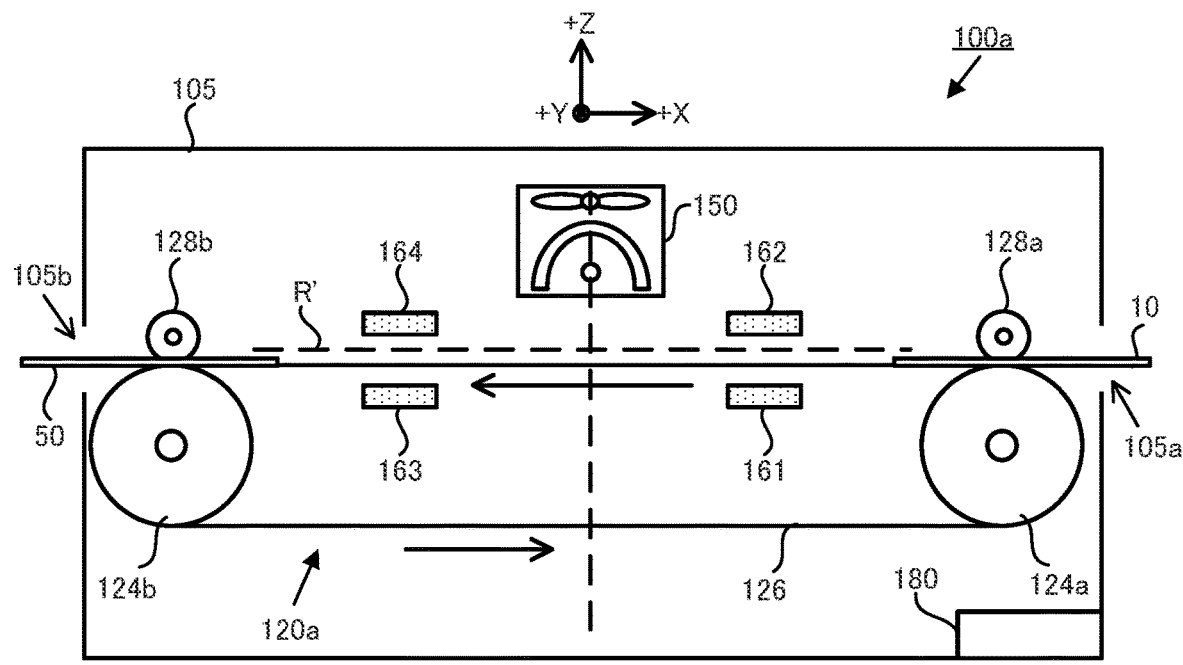
FIG. 13 is a schematic drawing illustrating a shaping device according to a modified example of Embodiment 1.

As an example, FIG. 13 illustrates a configuration of a shaping device 100a according to a modified example of Embodiment 1. As illustrated in FIG. 13, the shaping device 100a includes a conveyor 120a that includes the conveyor belt 126 on which the sheet 10 is placed and conveyed and that conveys the sheet 10 along a flat conveyance route R', the irradiator 150 that irradiates electromagnetic waves on the sheet 10 that is placed on and being conveyed by the conveyor belt 126, and the heaters 161 to 164 that heat the conveyor belt 126. Since the conveyance route R' of the shaping device 100a is flat, the conveyor 120a does not include the guide 122 and the tension roller 124c that cause the conveyor belt 126 to convexly curve. Thus, even in a case in which the sheet 10 is conveyed along the flat conveyance route R', the irradiator 150 can cause the sheet 10 to distend in a stable temperature environment by heating the conveyor belt 126 using the heaters 161 to 164.

Figure 14:
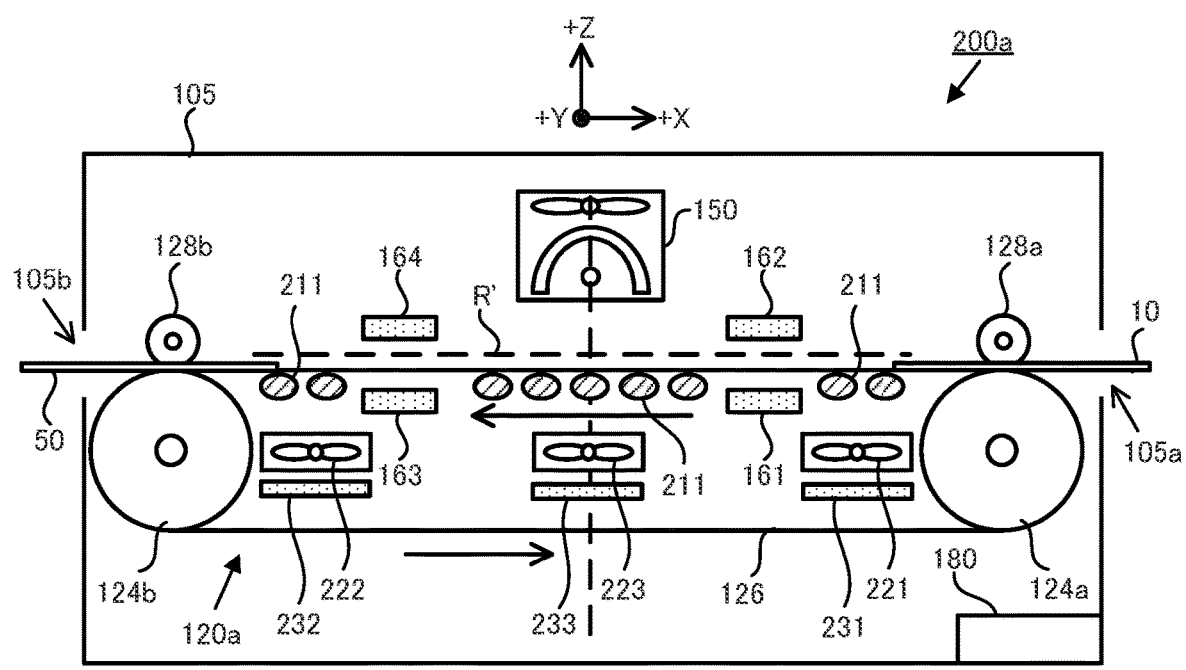
FIG. 14 is a schematic drawing illustrating a shaping device according to a modified example of Embodiment 2.

FIG. 14 illustrates a configuration of a shaping device 200a according to a modified example of Embodiment 2. In addition to the configuration of the shaping device 100a illustrated in FIG. 13, the shaping device 200a includes the piping 211, the water supplier 212 (not illustrated in the drawings), the fans 221 to 223, and the fan heaters 231 to 233. These components are the same as those described in Embodiment 2. In Embodiment 2, the conveyance route R is convexly curved, but in FIG. 14, the various components are disposed so as to fit to the flat conveyance route R'. Note that the guide 122 and the tension roller 124c may be provided even when the conveyance route R' is flat such as in FIGS. 13 and 14. Thus, even when the conveyance route R' is flat, as in Embodiment 2, the temperature of the conveyor belt 126 heated by the heaters 161 to 164 can be adjusted using the piping 211 or the fans 221 to 223 so as to maintain suitable temperature conditions.

Even when the conveyance route R is convexly curved such as in Embodiments 1 and 2, the shaping device 100, 200 may include the guide 122. That is, while it is preferable that the guide 122 contact the entire surface of the outgoing portion inner side of the conveyor belt 126 so as to cause the conveyance route R convexly curve, provided that the conveyance route R can be caused to convexly curve, the guide 122 may be omitted. For example, a configuration is possible in which the conveyor belt 126 is supported at the minimal positions such as two locations on both ends in the width direction (the Y direction) of the peak T of the convexly curved conveyance route R. Moreover, a configuration is possible in which a plurality of heaters is disposed along the convexly curved conveyance route R, and the plurality of heaters directly heats or cools the inner side of the conveyor belt 126 without involving the guide 122.

A configuration is possible in which a guide that supports the presser belts 131, 132 is provided on the inner side of the tensioner 130. Furthermore, a configuration is possible in which a temperature sensor is provided on the inner side of the tensioner 130, and the temperature sensor measures the temperature of the guide provided on the inner side of the tensioner 130 to indirectly measure the temperature of the conveyor belt 126. Moreover, a configuration is possible in which the guide is heated by a heater to transmit heat to the tensioner 130.

In Embodiments 1 and 2, the sheet 10 includes the base 20 and the thermally expansive layer 30. However, the sheet 10 described above in the Embodiments is merely an example, and a variety of sheets 10 with different layer configurations, sizes, thicknesses, and the like can be used. For example, a configuration is possible in which the sheet 10 includes an ink receiving layer that absorbs and receives ink. The ink receiving layer is formed from a material suitable for holding printing ink, toner, and the like on the surface of the ink receiving layer. Alternatively, the sheet 10 may include a layer made from another desired material.

In Embodiments 1 and 2, in the controller 181, the CPU executes the program stored in the ROM to control the various components of the shaping device 100, 200. However, in the present disclosure, the controller 181 may include, for example, an Application Specific Integrated Circuit (ASIC), a Field-Programmable Gate Array (FPGA), various control circuitry, or other dedicated hardware instead of the CPU, and this dedicated hardware may control the various components of the shaping device 100. In this case, the various functions of the controller 181 may be realized by individual pieces of hardware, or the various functions of the controller 181 may be collectively realized by a single piece of hardware. Additionally, the various functions may be realized in part by dedicated hardware and in part by software or firmware.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A shaping device, comprising:
    a conveyor belt wound on driving rollers within a housing and on which a sheet is placed for conveyance along a convexly curved route extending from a loading port to a discharge port of the housing, the sheet distending due to being irradiated with electromagnetic waves to form a three-dimensional image;
    an irradiator that irradiates the electromagnetic waves on the sheet placed on the conveyor belt; and
    at least one heater that heats the conveyor belt, the shaping device maintaining a constant temperature of the entire conveyor belt within the housing.

2. The shaping device according to claim 1, further comprising:
    on an inner side of the conveyor belt, a guide that supports the conveyor belt and that conducts heat with the conveyor belt.

3. The shaping device according to claim 1, wherein the at least one heater is disposed at least upstream from the irradiator with respect to a conveyance direction of the conveyor belt.

4. The shaping device according to claim 3, wherein the at least one heater comprises a first heater disposed below a conveyance surface of the conveyor belt and a second heater disposed above the conveyance surface, the first heater and the second heater being disposed upstream from the irradiator with respect to the conveyance direction.

5. The shaping device according to claim 4, further comprising:
    a third heater disposed below the conveyance surface and a fourth heater disposed above the conveyance surface, the third heater and the fourth heater being disposed downstream from the irradiator with respect to the conveyance direction.

6. The shaping device according to claim 3, wherein the at least one heater further comprises at least one heater disposed downstream from the irradiator with respect to the conveyance direction.

7. The shaping device according to claim 1, further comprising:
    a temperature adjuster that adjusts a temperature of the conveyor belt heated by the at least one heater.

8. The shaping device according to claim 7, wherein the temperature adjuster is configured to cool the conveyor belt when the temperature of the conveyor belt heated by the at least one heater is higher than a reference temperature, and is configured to heat the conveyor belt when the temperature of the conveyor belt heated by the at least one heater is lower than the reference temperature.

9. The shaping device according to claim 8, wherein the temperature adjuster comprises a piping passing through an inner side of the conveyor belt and circulating a thermal medium, and wherein the piping circulates the thermal medium in a condition having a temperature lower than the reference temperature when the temperature of the conveyor belt heated by the at least one heater is higher than the reference temperature, and circulates the thermal medium in a condition having a temperature higher than the reference temperature when the temperature of the conveyor belt heated by the at least one heater is lower than the reference temperature.

10. The shaping device according to claim 7, wherein the temperature adjuster comprises a piping that passes through an inner side of the conveyor belt and that circulates a thermal medium.

11. The shaping device according to claim 10, wherein, on the inner side of the conveyor belt, the piping passes through at least positions upstream and downstream from the irradiator with respect to the conveyance direction of the conveyor belt, and through a position facing the irradiator across a conveyance surface of the conveyor belt.

12. The shaping device according to claim 7, wherein the temperature adjuster comprises at least one fan that blows toward the conveyor belt.

13. The shaping device according to claim 12, wherein the at least one fan comprises a first fan disposed upstream from the irradiator with respect to the conveyance direction of the conveyor belt, a second fan disposed downstream from the irradiator with respect to the conveyance direction, and a third fan disposed at a position facing the irradiator across a conveyance surface of the conveyor belt.

14. The shaping device according to claim 12, further comprising:
a fan heater that heats air blown by the at least one fan; wherein
the at least one fan blows the air heated by the fan heater toward the conveyor belt to heat the conveyor belt.

15. The shaping device according to claim 12, wherein the at least one fan is configured to cool the conveyor belt whereby a rotational speed of the at least one fan is changed in accordance with the temperature of the conveyor belt heated by the at least one heater.

16. The shaping device according to claim 1, wherein the sheet includes
a base,
a thermally expansive layer that is laminated on a first main surface of the base and that expands due to being heated, and
a heat conversion layer that is laminated on at least one of a second main surface of the base or the thermally expansive layer, and that heats the thermally expansive layer by absorbing the electromagnetic waves and converting the electromagnetic waves to heat.

17. The shaping device according to claim 16, wherein
the thermally expansive layer expands as a result of being heated to a predetermined expansion temperature or higher, and
the at least one heater heats the conveyor belt to a temperature lower than the predetermined expansion temperature.

18. A production method for a shaped object using the shaping device according to claim 1, the production method comprising:
heating the conveyor belt;
placing the sheet on the heated conveyor belt, and conveying the sheet; and
irradiating the conveyed sheet with the electromagnetic waves.

19. The production method according to claim 18, wherein
the sheet includes
a base,
a thermally expansive layer that is laminated on a first main surface of the base and that expands due to being heated, and
a heat conversion layer that is laminated on at least one of a second main surface of the base or the thermally expansive layer, and that heats the thermally expansive layer by absorbing the electromagnetic waves and converting the electromagnetic waves to heat.

* * * * *